United States Patent [19]

Hayes, Jr. et al.

[11] 3,870,812

[45] Mar. 11, 1975

[54] PROTEIN GEL MODIFICATION

[75] Inventors: John T. Hayes, Jr., North Tarrytown; William E. Marshall, Mount Kisco, both of N.Y.

[73] Assignee: General Foods Corporation, White Plains, N.Y.

[22] Filed: Apr. 27, 1973

[21] Appl. No.: 355,104

Related U.S. Application Data

[63] Continuation of Ser. No. 25,284, April 2, 1970, abandoned.

[52] U.S. Cl. ................. 426/350, 426/167, 426/364
[51] Int. Cl. ................................................ A23j 3/00
[58] Field of Search ............ 426/350, 364, 167, 104

[56] References Cited
UNITED STATES PATENTS

| | | | |
|---|---|---|---|
| 3,142,571 | 7/1964 | McAnelly | 99/14 |
| 3,496,858 | 2/1970 | Jenkins | 99/17 |
| 3,498,794 | 3/1970 | Calvert et al. | 99/17 |
| 3,630,753 | 12/1971 | Melnychyn et al. | 99/17 |

OTHER PUBLICATIONS

Altschul, "Processed Plant Protein Foodstuffs," 1958, pages 410 and 411.

*Primary Examiner*—James R. Hoffman
*Attorney, Agent, or Firm*—Bruno P. Struzzi; Thomas V. Sullivan

[57] ABSTRACT

The viscosity of a vegetable protein dispersion is decreased and controlled by treatment with an agent that acts to break the disulfide bonds of the protein. The protein dispersion is gelled to a stable physical shape by heating.

4 Claims, No Drawings

PROTEIN GEL MODIFICATION

This is a continuation of application Ser. No. 25,284, filed Apr. 2, 1970 and now abandoned.

BACKGROUND OF THE INVENTION

The present invention is directed to the formation of a gelled protein component that has desirable soft textural qualities. Such product may be employed in low cost vegetable substitutes for meat.

In recent years, extensive research and development has been undertaken to form vegetable sources to replace meat containing foods. Domestic animals raised primarily for food purposes are fed a diet that is derived predominantly from vegetable sources. The conversion of the vegetable material in the growth of the animal is a relatively inefficient process to produce a food. In today's society, the population is continuously expanding, which is coupled with the fact that large portions of the world suffer from malnutrition as well as hunger. Therefore, the development of additional, inexpensive food sources is essential.

One way of increasing the protein food supply is by processing vegetable protein sources to at least supplement present inefficient techniques of growing animal products. The production of meat-like substitutes, or in other words, analogs, is one area which lends itself to huge economomies. The substitution of a processed meat analog made from vegetable sources rich in protein content is desirable. This processed food could have similar nutritional characteristics to the protein rich meat, but such analog would be more efficiently produced.

However, difficulties have resulted in the formation of meat analogs from vegetable materials high in protein content, since the meat product must be duplicated as closely as possible for consumer acceptance. Thus, not only must flavor be duplicated, but the essential textural and chewiness of the analog must resemble the meat product, otherwise poor quality will result. Textural qualities of the meat analog must parallel its counterpart to gain a favorable impact upon the consumer.

The prior art in the development of meat analogs has gone to physical process steps with a variety of formulations in producing desirable textural qualities. An example is extruding the protein in an acid bath for fiber formation to give needed chewiness qualities. Also, various ingredients have been introduced into the protein system to yield the necessary characteristics of taste, texture, moisture content and chewiness.

SUMMARY OF THE INVENTION

The present invention discloses the control of textural and softness qualities of a vegetable gel that contains a large amount of vegetable protein. The gel is formed from a protein dispersion that is heated which causes gelation to a stable physical form. The properties of the final gel are influenced by the viscosity of the dispersion containing the proteinaceous vegetable material prior to heating. Generally, the higher the overall viscosity of the proteinaceous dispersion in a liquid medium the harder will be the formed gel. In contrast, lowering the viscosity of a liquid containing proteinaceous material in a specific concentration results in a softer gel after a heat setting operation.

The present invention controls and lowers the viscosity of a proteinaceous vegetable dispersed in a liquid by breaking disulfide bonds that naturally exist in the protein. As a consequence, regulating the viscosity of a dispersion of proteinaceous material in a liquid helps to dictate the final qualities of the gel.

Thus, it may be seen that many important advantages flow from the gel system employed in the present invention. The disclosed gel may be utilized where hardness qualities interfere with use of the gelled vegetable system. For example, the overall gel in a heated protein may become unsatisfactory due to added components and fillers, e.g., casein, which adds hardness qualities upon heat set. However, with a softer gel from the vegetable component, greater qualities of additives may be tolerated without undesirable hardness characteristics.

Additionally, the gel system has utility as a binder for vegetable protein fibers wherein a chewy meat product such as a steak is duplicated. The protein fibers yield chewy qualities and it is preferable that the binding gel be unobstrusive. Therefore, a soft gel that possesses binding qualities is highly desirable.

It is an object of this invention to provide an improved technique of processing vegetable material, including oil seed constituents, such as soy, to increase the palatability for human consumption.

It is a further object of the invention to produce a meat substitute from a vegetable containing protein whereby the relatively inefficient process of producing meat is bypassed.

It is a most specific object of the invention to produce a gel component in a meat analog which has controlled textural properties.

DETAILED DESCRIPTION OF THE INVENTION

A vegetable material in which protein has been concentrated is the raw material in producing a gel that may represent a meat analog. The vegetable material has been concentrated so that a preferred minimum protein content should be at least 30% by weight of solids (i.e., dry basis).

There is no upper limit on the maximum protein content and highly concentrated proteinaceous materials, isolates, are desirable. Therefore, concentrations of protein in excess of 80% to 90% may be employed. The vegetable proteinaceous material of this invention has the quality that, upon heating, gelation to a stable physical form occurs.

The sources of concentrated vegetable protein are varied and include soybean, peanuts, cottonseed, sesame, sunflower and the like. The concentration of the protein from various protein sources is well known in the art and does form a specific portion of the invention. For example, solvent extraction for removal of oil and additional fatty materials from an oilseed is a conventional technique in the art. These concentrated vegetable proteins are supplied in many physical forms such as ground flour or meal, pellets, bits or grits.

A concentrated vegetable protein is mixed with a liquid, and the viscosity of the dispersion is lowered and controlled by use of a disulfide bond cleaving material. Water is the preferred carrier, however, any liquid may be utilized which supports the disulfide bond breaking and subsequent gelation of the protein. Whenever protein dispersion is employed herein, it is intended to encompass a proteinaceous material that is in solution and/or suspended in a carrier liquid.

Initially it is necessary to define what is encompassed within the exact meaning of disulfide bond cleaving material. A disulfide bond cleaving material or disulfide bond cleaving agent is defined as a component that acts to cleave the disulfide bonds in a vegetable proteinaceous material and in so doing, brings about a lowering in viscosity of a dispersion of the protein material. This chemical breaking of disulfide bonds is a critical aspect of the invention. The physical result that occurs, namely, reduction in viscosity of the protein dispersion, is a highly desirable technique in strict control of physical qualities in the final food product.

Numerous agents are known that bring about disulfide bond breaking with the resulting decrease of dispersion viscosity. It must be realized that the utility of the agent is in a food product and, therefore, this fact controls the choice and/or concentration of the particular agent chosen. Some materials should not be employed in foods in any concentration. Other materials may be utilized satisfactorily, but there may be a maximum concentration placed on their addition. For example, from taste considerations, a specific additive may be incorporated which is satisfactory and often most desirable at low concentrations, but at higher concentration introduces a predominant taste characteristic which would not be highly desirable. However, the choice and concentration of the disulfide bond breaking agent or mixtures thereof from those available is well within the ordinary skill of one in the art.

Illustrative of agents that break disulfide bonds with a lowering of viscosity are both organic and inorganic compounds. An example of class of organic compounds that brings about the desired change is those containing sulfhydryl groups. Such materials containing sulfhydryl groups are varied including lower alkyl mercaptans and thio acids. Preferred examples of such agents are cystine, cysteine and their salts. Other disulfide bond cleaving substances are thioglycolates, mercaptoethanol and mercaptoethylamine. Cleaving agents that are inorganic include sodium sulfite and sodium borohydride.

With an effective concentration, the degree of disulfide bond cleavage is generally proportional to the amount of disulfide bond cleaving agent employed. However, as excessive amounts of the agent are employed, the less efficient will be the effect of the viscosity controlling agent. In other words, if a minimum amount of cleaving agent is used, there will be numerous S-S bonds to be broken per unit weight of agent. However, with excessive amounts of the agent employed, there will be a minimum number of S-S bonds per unit weight and the cleavage will no longer be approximately proportional to the amount of agent.

The desired concentration of the disulfide bond breaking agent may be readily determined on the basis of either total weight of proteinaceous material or the weight of protein solids. It must be realized, however, that the most important factor is the number of disulfide bonds that are present in the protein to be broken. In other words, equal weights of proteinaceous material may vary in the concentration of disulfide bonds present. It is the cleavage of the disulfide bonds with a resulting lowering of viscosity of a liquid containing the protein that helps determine the softness of the heat set gel.

Generally speaking, the percentage to produce an efficient degree of cleavage will be below about 2 - 3%, based on the weight of the proteinaceous vegetable material. A desirable percentage will be of the order of about 0.5% by weight of disulfide bond cleaving agent. The disclosed percentages are for illustrative purposes, since the exact percentage will be dependent in part upon the protein content, the number of disulfide bonds and the final utility of the end product. Obviously, the degree of disulfide bond breaking needed will determine the amount of agent used. The softness of the desired gel after heat setting is a factor that aids in dictating the amount of agent.

Prior to the disulfide bond cleavage agent, various additives may be mixed with the proteinaceous materials. No significant degree of interference with the disulfide bond cleavage should occur from the additives. Therefore, this criteria determines the choice of added components that may be introduced prior to disulfide bond breakage. Alternative ways of introducing the additive exist, namely incorporation into the protein dispersion after viscosity control by cleavage of the disulfide bonds or incorporation into the product after the proteinaceous gel has been formed. Obviously, there may be separate introduction of components during different stages in the process.

The additives employed are well known in the food field and are dependent in part upon the final utility of the product. Suitable additives include fats, proteins, starches, color flavoring, fillers, etc.

It is a critical aspect of this invention that the vegetable protein containing cleaved disulfide bonds be heat set to form the gel with the controlled textural and softness properties. It is the gel component softness control wherein critical novelty lies. Therefore, heat setting of the gel is necessary.

As employed herein, a gel refers to a solid or semisolid system of protein in colloidal dimensions in a liquid which is preferably water. The gel possesses elasticity. In most instances, the gel will possess heat irreversibility in that further heating encountered in normal cooking will not change the physical characteristics of the gel.

The heating of the protein dispersion to form the gel may be accomplished by a variety of heating techniques which can include autoclaving, deep fat frying, use of microwaves, and the like. The range of heating temperature may be varied within wide ranges including about 150° F. to about 350° F. At low temperatures, longer times are required. At high temperature, faster gelling occurs, but with excessive treatment, unnecessary degradation of the protein may take place. A preferred heating technique to form the gel is by an autoclaving operation, since relatively short heat set times are utilized with ease of control.

It may be necessary before gelation to adjust the pH of the protein dispersion. For example, the use of disulfide bond cleaving agent may cause the pH to lie outside a desired range at gelling of about 5.0 to about 8.0. An additive, e.g., a base, may be necessary to bring the pH within a desired range from a gelling standpoint. Also, highly acid or basic materials are undesirable from taste considerations.

To further disclose the innovative aspects of the invention, the following examples illustrate the system produced by utilizing a controlled viscosity dispersion of vegetable protein:

EXAMPLE 1

A concentrated vegetable soy protein source is obtained by using a commercially prepared isolate from Nitrisoy 7B. This material is an isoelectric isolate prepared by the usual alkaline extraction, acid precipitation procedure. This isolate is defrosted and excess water is removed by a pressing through cheesecloth to yield a 1,000 grams sample. The pH of this isolate is 4.5 with a water content of 53%. Cysteine.HCl.H$_2$O is employed as the disulfide cleaving agent. Into 300 ml. distilled H$_2$O is disolved 9.4 grams of the agent. This solution is slowly added to the prepared isolate with mechanical stirring. After addition, the overall pH is 3.6. The pH of this dispersion is raised by addition of 184 ml of the 1N sodium hydroxide with mechanical stirring to give a final pH of 6.45 with a water content of 68.4%. The use of cysteine.HCl.H$_2$O results in a dispersion with significantly decreased viscosity.

EXAMPLE 2

The technique of Example 1 was repeated except the 1,050 grams of isolate having a water content of 50.6% and 2.59 cysteine.HCl.H$_2$O were employed. The pH of the dispersion was 4.4 after cysteine.HCl.H$_2$O addition. The pH is adjusted in the same fashion as Example 1 with 1N sodium hydroxide employed to give a final pH of 6.3. The water content of Example 2 is similar to Example 1, but the viscosity decrease of Example 2 is less.

EXAMPLE 3

To form a product that resembles a hot dog, the following constiturents were employed:

|  | Percent |
|---|---|
| Protein Dispersion (Example 2) | 43.5 |
| Expanded Soy Protein | 21.0 |
| Fat | 19.0 |
| Water | 14.0 |
| Seasonings/spice/flavor | 2.5 |

The expanded soy protein that is employed in the composition if formed by mixing soy grits with water to give a moisture concentration of about 25%. About 0.2% cysteine is added which adds expansion. The mix is introduced into an inlet of a heated Model X-25 Wenger Extruder which employs a revolving screw. The mix in the extruder is subject to elevated temperature and pressure and extruded to the atmosphere through two ⅜ inch diameter dies. The recorded temperature and pressure immediately prior to extrusion were 290° F. and 125 psig. The expanded product is ground and soaked in water and is ready for use as a filler additive.

The entire composition of this example, namely, the protein dispersion of controlled viscosity, the expanded soy protein, water, fat, seasonings, spice and flavor components were blended to obtain a homogenous mixture. The mixture is stuffed in a casing used in production of meat-type hot dogs. This shaped mixture is subjected to an autoclaving operation under a pressure of 7 – 9 psig. for 10 minutes. The product was stored overnight under refrigeration.

Upon removal of the casing, a product resembling a hot dog in taste, texture and appearance was produced.

The above examples are considered illustrative of the composition and process conditions that may be employed in producing a gel of controlled hardness and texture. Obviously, many modifications in source materials and techniques of processing will become obvious to those skilled in the art, and therefore, all modifications are intended to be included with the scope of the claims.

What is claimed is:

1. A method for making a gelled protein food product having a softer and controlled texture comprising:
   a. mixing vegetable protein isolate prepared by precipitating protein at about the iso-electric point of the protein with a major amount of water to produce an aqueous dispersion of protein isolate in water,
   b. said dispersed isolate being present in an amount effective to form a thermally irreversible gel upon autoclaving,
   c. said dispersion further containing an effective amount of a disulfide bond breaking agent sufficient to control and reduce the viscosity of the aqueous dispersion and effective to give a softer gel after autoclaving,
   d. adjusting the pH of the dispersion to about 5.0 to about 8.0,
   e. encasing the reduced viscosity dispersion to shape the dispersion,
   f. autoclaving the shaped reduced viscosity dispersion at a temperature and for a time period sufficient to produce a stable, thermally irreversible gel, said gel being softer than that obtained without treatment of the isolate with disulfide bond breaking agent.

2. The method of claim 1 wherein the agent contains sulfhydryl groups.

3. The method of claim 1 wherein said agent is cysteine.

4. The method of claim 1 wherein said agent is sodium sulfite.

* * * * *